US011760360B2

(12) United States Patent
Chen

(10) Patent No.: US 11,760,360 B2
(45) Date of Patent: *Sep. 19, 2023

(54) SYSTEM AND METHOD FOR IDENTIFYING A TYPE OF VEHICLE OCCUPANT BASED ON LOCATIONS OF A PORTABLE DEVICE

(71) Applicant: Honda Motor Co., Ltd., Tokyo (JP)

(72) Inventor: Bonnie Hu Chen, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,131

(22) Filed: Aug. 23, 2021

(65) Prior Publication Data
US 2021/0380116 A1  Dec. 9, 2021

Related U.S. Application Data

(63) Continuation of application No. 16/400,318, filed on May 1, 2019, now Pat. No. 11,148,670.
(Continued)

(51) Int. Cl.
*B60W 40/08* (2012.01)
*G01S 11/06* (2006.01)
*G01S 5/14* (2006.01)

(52) U.S. Cl.
CPC ............ *B60W 40/08* (2013.01); *G01S 5/14* (2013.01); *G01S 11/06* (2013.01); *B60W 2040/0881* (2013.01)

(58) Field of Classification Search
CPC ............ B60K 2370/56; B60K 35/00; B60W 2040/0881; B60W 2540/01;
(Continued)

(56) References Cited

U.S. PATENT DOCUMENTS 6,081,756 A * 6/2000 Mio ................. G05D 1/0293
701/28
7,365,769 B1 * 4/2008 Mager .................. G06V 20/58
348/148
(Continued)

FOREIGN PATENT DOCUMENTS

CN 104995057 A 10/2015
CN 108494948 A 9/2018
(Continued)

*Primary Examiner* — Babar Sarwar
(74) *Attorney, Agent, or Firm* — RANKIN, HILL & CLARK LLP

(57) ABSTRACT

A system and method for identifying a type of vehicle occupant based on locations of a portable device that include receiving a plurality of communication signals from the portable device and evaluating received signal strength measurements of the plurality of communication signals to determine a tracking pattern that includes a tracked path of the portable device as a user approaches a vehicle, enters the vehicle, and is seated within a particular seat of the vehicle. The system and method also include identifying the user as a driver of the vehicle or a non-driving occupant of the vehicle based on the tracking pattern and controlling at least one vehicle system by executing vehicle settings associated with the driver of the vehicle and the non-driving occupant of the vehicle based on identifying the user as the driver of the vehicle or the non-driving occupant of the vehicle.

20 Claims, 6 Drawing Sheets

Related U.S. Application Data

(60) Provisional application No. 62/818,997, filed on Mar. 15, 2019.

(58) Field of Classification Search
CPC . B60W 2540/227; B60W 40/08; G01S 11/06; G01S 5/02; G01S 5/0295; G01S 5/14
See application file for complete search history.

(56) References Cited

U.S. PATENT DOCUMENTS

| | | | |
|---|---|---|---|
| 7,400,243 B2* | 7/2008 | Sumida | G07C 9/00309 340/572.1 |
| 7,859,432 B2* | 12/2010 | Kim | G01S 17/04 348/148 |
| 8,232,863 B2* | 7/2012 | Nakajima | G07C 9/28 340/5.72 |
| 8,527,146 B1* | 9/2013 | Jackson | B60W 50/0098 180/287 |
| 8,634,822 B2* | 1/2014 | Silver | H04W 4/16 340/439 |
| 8,781,170 B2* | 7/2014 | Mathieu | G02B 27/01 382/104 |
| 9,042,872 B1* | 5/2015 | Breed | G08B 21/02 455/414.1 |
| 9,120,484 B1* | 9/2015 | Ferguson | G05D 1/0212 |
| 9,164,511 B1* | 10/2015 | Ferguson | B60W 40/06 |
| 9,448,299 B2 | 9/2016 | Magarida et al. | |
| 9,510,159 B1* | 11/2016 | Cuddihy | H04W 4/40 |
| 9,738,125 B1* | 8/2017 | Brickley | B60D 1/62 |
| 9,769,308 B2* | 9/2017 | Livingston | H04M 1/72463 |
| 9,775,100 B1 | 9/2017 | Smereka et al. | |
| 9,812,008 B2* | 11/2017 | Tong | G08G 1/167 |
| 9,821,764 B2 | 11/2017 | Sugita | |
| 9,894,492 B1* | 2/2018 | Elangovan | H04W 4/023 |
| 10,015,639 B2* | 7/2018 | Dickow | B60W 40/08 |
| 10,077,056 B1* | 9/2018 | Fields | B60W 50/0098 |
| 10,093,229 B2* | 10/2018 | Baker | B60Q 9/00 |
| 10,134,278 B1* | 11/2018 | Konrardy | G08G 1/166 |
| 10,168,415 B2* | 1/2019 | Kanaga | G01S 5/0284 |
| 10,757,248 B1* | 8/2020 | Qian | H04W 4/44 |
| 2003/0128112 A1* | 7/2003 | Chow | B60Q 1/54 340/466 |
| 2003/0167123 A1* | 9/2003 | Nakazawa | G08G 1/166 340/436 |
| 2007/0168129 A1* | 7/2007 | Thorne | B60T 7/22 701/96 |
| 2007/0200672 A1* | 8/2007 | McBride | B60R 25/245 340/5.72 |
| 2008/0165028 A1* | 7/2008 | Fechner | G06V 10/255 340/901 |
| 2008/0180528 A1* | 7/2008 | Saito | H04N 7/18 348/148 |
| 2010/0075655 A1* | 3/2010 | Howarter | H04M 1/72415 455/420 |
| 2010/0076622 A1* | 3/2010 | Dickerhoof | B60R 25/24 701/2 |
| 2010/0198428 A1* | 8/2010 | Sultan | G07C 9/00309 701/2 |
| 2010/0201505 A1* | 8/2010 | Honary | G06Q 30/04 707/769 |
| 2011/0105097 A1* | 5/2011 | Tadayon | H04M 3/53 455/418 |
| 2012/0044066 A1* | 2/2012 | Mauderer | B60T 7/22 340/479 |
| 2012/0176499 A1* | 7/2012 | Winter | G06V 20/584 382/104 |
| 2012/0244877 A1* | 9/2012 | Margalef | G08C 17/02 455/456.1 |
| 2013/0029650 A1* | 1/2013 | Xiao | B60R 25/00 455/417 |
| 2013/0265414 A1* | 10/2013 | Yoon | G08G 1/161 382/105 |
| 2013/0271605 A1* | 10/2013 | Winner, Jr. | G08G 1/0175 348/148 |
| 2013/0336094 A1* | 12/2013 | Gruteser | G01S 5/26 367/117 |
| 2014/0184400 A1* | 7/2014 | Yang | B60Q 9/008 340/435 |
| 2014/0277942 A1* | 9/2014 | Kyrtsos | G01B 21/02 702/159 |
| 2014/0297220 A1* | 10/2014 | Raffa | B60R 16/037 702/150 |
| 2014/0335902 A1* | 11/2014 | Guba | H04W 4/48 381/86 |
| 2015/0161888 A1* | 6/2015 | Kim | G08G 1/052 340/936 |
| 2016/0036964 A1* | 2/2016 | Barfield, Jr. | H04M 1/72454 455/418 |
| 2016/0068156 A1* | 3/2016 | Horii | B60W 30/18163 701/28 |
| 2016/0226865 A1* | 8/2016 | Chen | G06Q 20/321 |
| 2016/0322078 A1* | 11/2016 | Bose | G01P 13/00 |
| 2016/0337815 A1* | 11/2016 | Cuddihy | H04W 4/40 |
| 2016/0349354 A1* | 12/2016 | Yomo | G01S 13/931 |
| 2016/0379350 A1* | 12/2016 | Matsui | G06V 20/584 348/125 |
| 2017/0101093 A1* | 4/2017 | Barfield, Jr. | G08G 1/09675 |
| 2017/0116853 A1* | 4/2017 | Hu | B60R 1/00 |
| 2017/0190286 A1* | 7/2017 | Yavitz | G01S 19/52 |
| 2017/0240109 A1* | 8/2017 | Kimura | G08G 1/16 |
| 2017/0263120 A1* | 9/2017 | Durie, Jr. | G08G 1/205 |
| 2017/0316693 A1* | 11/2017 | Kim | G08G 1/164 |
| 2017/0316694 A1* | 11/2017 | Ryu | G08G 1/166 |
| 2017/0330455 A1* | 11/2017 | Kikuchi | G06V 20/582 |
| 2018/0144202 A1* | 5/2018 | Moosaei | G06V 20/584 |
| 2018/0192285 A1* | 7/2018 | Schmidt | H04W 4/48 |
| 2018/0198523 A1* | 7/2018 | Liu | H04B 10/60 |
| 2018/0208208 A1* | 7/2018 | Chen | B60R 16/037 |
| 2018/0242113 A1* | 8/2018 | Macneille | H04W 4/02 |
| 2019/0019414 A1* | 1/2019 | Guan | G06V 20/63 |
| 2019/0025402 A1* | 1/2019 | Qu | G01S 5/30 |
| 2019/0035276 A1* | 1/2019 | Zruya | G08G 1/166 |
| 2019/0086914 A1* | 3/2019 | Yen | G05D 1/0293 |
| 2019/0147741 A1* | 5/2019 | Rosas-Maxemin | G01C 21/362 701/425 |
| 2019/0149654 A1* | 5/2019 | Stuntebeck | H04M 1/724631 455/418 |
| 2019/0176687 A1* | 6/2019 | Nagata | B60W 40/13 |
| 2019/0349466 A1* | 11/2019 | Cohen | H04M 1/72463 |
| 2020/0290626 A1* | 9/2020 | Chen | B60K 35/00 |

FOREIGN PATENT DOCUMENTS

| | | | | |
|---|---|---|---|---|
| EP | 1341140 A1 | * | 9/2003 | G08G 1/166 |
| EP | 3176725 A1 | * | 6/2017 | G06K 9/00825 |

* cited by examiner

SYSTEM AND METHOD FOR IDENTIFYING A TYPE OF VEHICLE OCCUPANT BASED ON LOCATIONS OF A PORTABLE DEVICE

CROSS-REFERENCE TO RELATED APPLICATION

This application is a continuation of, and claims priority to U.S. application Ser. No. 16/400,318 filed on May 1, 2019, the entire application of which is incorporated herein by reference; U.S. application Ser. No. 16/400,318 claims priority to U.S. Provisional Application Ser. No. 62/818,997 filed on Mar. 15, 2019, which is also incorporated herein by reference.

BACKGROUND

Many vehicles today include vehicle systems and features that may be adjusted based on user preferences associated with one or more drivers and/or one or more non-driving occupants. The user preferences may be utilized to adjust various settings of the features of vehicle systems in order to provide a customized environment within the vehicle for a particular driver and/or non-driving occupant. In many instances, a vehicle is utilized by various individuals that each have a different set of vehicle settings that need to be adjusted within the vehicle based on which individuals are occupying the vehicle. Identifying which set of settings to apply may be a complicated process especially when the vehicle is utilized by various individuals who may each have respective settings that are to be applied to the same vehicle.

BRIEF DESCRIPTION

According to one aspect, a computer-implemented method for identifying a type of vehicle occupant based on locations of a portable device that includes receiving a plurality of communication signals from the portable device. The computer-implemented method also includes evaluating received signal strength measurements of the plurality of communication signals to determine a tracking pattern that includes a tracked path of the portable device as a user approaches a vehicle, enters the vehicle, and is seated within a particular seat of the vehicle and identifying the user as a driver of the vehicle or a non-driving occupant of the vehicle based on the tracking pattern. The computer-implemented method further includes controlling at least one vehicle system by executing vehicle settings associated with the driver of the vehicle and the non-driving occupant of the vehicle based on identifying the user as the driver of the vehicle or the non-driving occupant of the vehicle.

According to another aspect, a system for identifying a type of vehicle occupant based on locations of a portable device that includes a memory storing instructions when executed by a processor cause the processor to receive a plurality of communication signals from the portable device. The instructions also cause the processor to evaluate received signal strength measurements of the plurality of communication signals to determine a tracking pattern that includes a tracked path of the portable device as a user approaches a vehicle, enters the vehicle, and is seated within a particular seat of the vehicle and identify the user as a driver of the vehicle or a non-driving occupant of the vehicle based on the tracking pattern. The instructions further cause the processor to control at least one vehicle system by executing vehicle settings associated with the driver of the vehicle and the non-driving occupant of the vehicle based on identifying the user as the driver of the vehicle or the non-driving occupant of the vehicle.

According to yet another aspect, a non-transitory computer readable storage medium storing instructions that when executed by a computer, which includes a processor perform a method that includes receiving a plurality of communication signals from a portable device. The method also includes evaluating received signal strength measurements of the plurality of communication signals to determine a tracking pattern that includes a tracked path of the portable device as a user approaches a vehicle, enters the vehicle, and is seated within a particular seat of the vehicle and identifying the user as a driver of the vehicle or a non-driving occupant of the vehicle based on the tracking pattern. The method further includes controlling at least one vehicle system by executing vehicle settings associated with the driver of the vehicle and the non-driving occupant of the vehicle based on identifying the user as the driver of the vehicle or the non-driving occupant of the vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
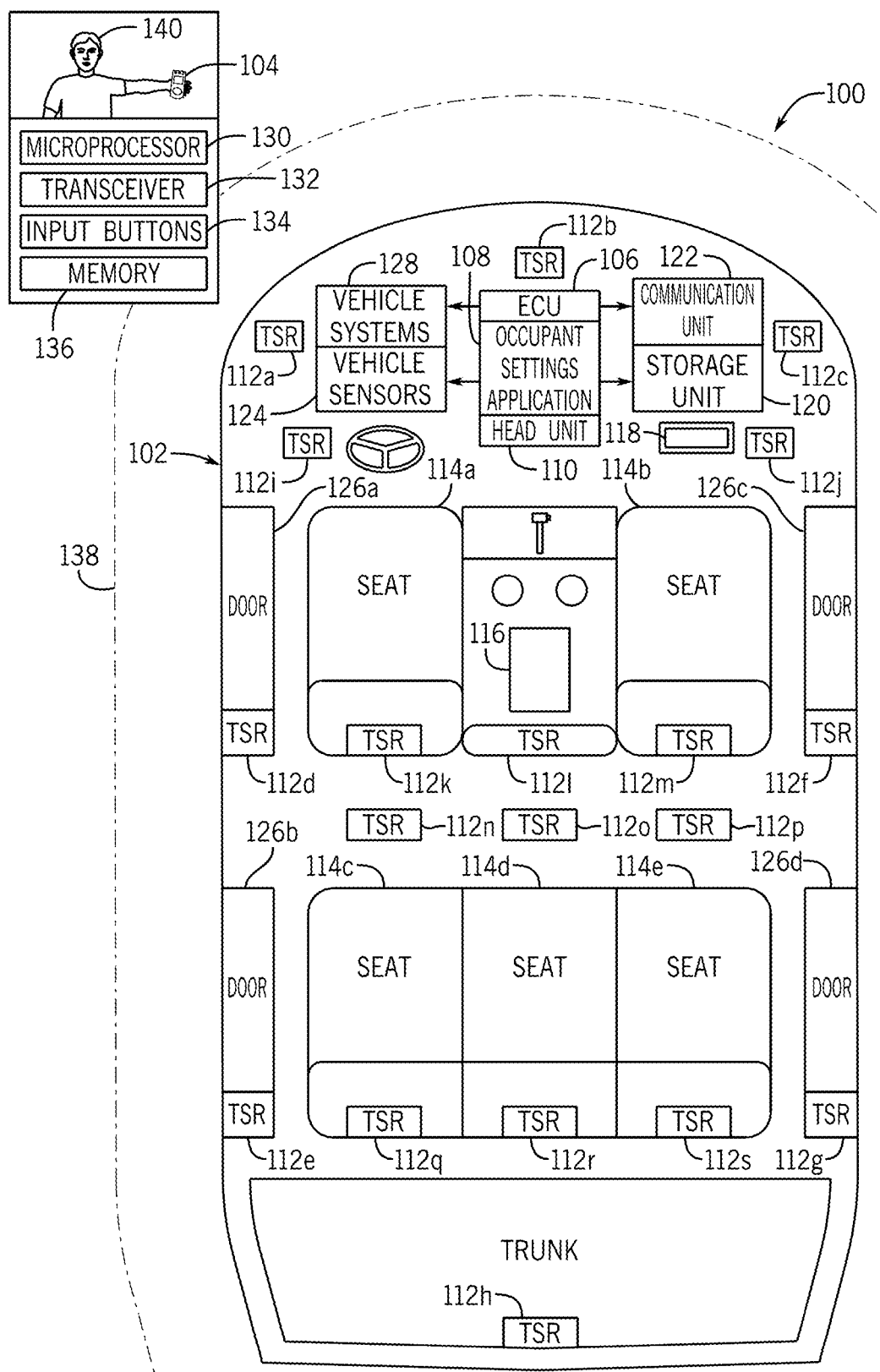
FIG. 1 is a schematic view of an operating environment for implementing systems and methods for identifying a type of vehicle occupant based on locations of a portable device according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "database", as used herein may refer to table, a set of tables, a set of data stores and/or methods for accessing and/or manipulating those data stores. Some databases may be incorporated with a disk as defined above.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "vehicle system", as used herein may include, but is not limited to, any automatic or manual systems that may be used to enhance the vehicle, driving and/or safety. Exemplary vehicle systems include, but are not limited to: a vehicle HVAC system, a vehicle infotainment system, a vehicle engine control system, a vehicle GPS/navigation system, a vehicle seat position settings system, vehicle steering/mirror position setting system, a vehicle driver customization settings system, a vehicle transmission control system, vehicle safety control systems, vehicle stability control systems, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a brake pedal system, an electronic power steering system, a proximity sensor systems, and an electronic pretensioning system, among others.

A "vehicle sensors", as used herein may include, but is not limited to, electric current/potential (e.g., proximity sensors, inductive, capacitive), ultrasonic (e.g., piezoelectric, electrostatic), vibration, optical, vision, photoelectric or oxygen sensors, among others.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an operating environment 100 for implementing systems and methods for identifying a type of vehicle occupant based on locations of a portable device 104 according to an exemplary embodiment of the present disclosure. The components of the environment 100, as well as the components of other systems, hardware architectures, and software architectures discussed herein, may be combined, omitted, or organized into different architectures for various embodiments.

Generally, the environment 100 may include the vehicle 102 that includes a plurality of components that are operably controlled by an electronic control unit (ECU) 106 of the vehicle 102. In one embodiment, the ECU 106 may be configured to execute an occupant identification application (occupant settings application) 108. As described in more detail below, the occupant settings application 108 may be executed to present one or more interfaces on a display screen (not shown) of a head unit 110 of the vehicle 102. In some embodiments, the occupant settings application 108 may be executed on the portable device 104 that may be carried by a user 140 of the application 108.

As described in more detail below, the occupant settings application 108 may be executed to identify a type of vehicle occupant as a vehicle driver or a non-driving occupant of the vehicle 102 based on a travel path and (an end point) stationary position of the portable device 104. The travel path and stationary position of the portable device 104 is based on the movement of a user 140 (i.e., a vehicle occupant) that carries the portable device 104 when the user 140 approaches the vehicle 102 (from an external location), the user 140 enters the vehicle 102, the user 140 is seated within the vehicle 102, and when the user 140 continues to carry the portable device 104 in a fixed location (e.g., continued to be carried by the user 140 as they are seated within a seat 114a-114d, placed within the user's pocket as they are seated within a seat 114a-114d) or places the portable device 104 within a particular area (e.g., seat, center console, glove compartment) of the vehicle 102.

In particular, the occupant settings application 108 may utilize received signal strength indication location tracking (RSSI location tracking) of the portable device 104 based on received signal strength indication measurements (RSSI measurements) of communication signals (e.g., RF signals) that are transmitted by the portable device 104 and received by one or more transceivers 112a-112s of the vehicle 102 to identify the user 140 carrying the portable device 104 as a type of vehicle occupant that includes the driver of the vehicle 102 or the non-driving occupant of the vehicle 102.

As discussed, such RSSI location tracking may utilize RSSI measurements to determine a travel path of the portable device 104 as it approaches the vehicle 102 (e.g., as it's being carried by the user 140), as it enters the vehicle 102, and as the portable device 104 is put within a stationary position (e.g., the portable device 104 is no longer being moved as the user 140 is in a single location or continues to carry the portable device 104 within a fixed location or places the portable device 104 within a particular location of the vehicle 102) as the user 140 is seated within the vehicle 102. For example, the stationary position may include a location of the portable device 104 within the user's pocket as the user 140 is seated within a particular seat 114a-114e of the vehicle 102, a particular non-driver seat 114b-114e of the vehicle 102 based on the user's placement of the portable device 104 (e.g., or a bag containing the portable device 104), within a center console 116 (e.g., storage container) of the vehicle 102 based on the user's placement of the portable device 104, or within a glove compartment 118 of the vehicle 102 based on the user's placement of the portable device 104.

As discussed below, the application 108 may be configured to compare a RSSI tracking pattern based on RSSI tracked locations of the portable device 104 against one or more pre-stored driver device location patterns and/or one or more pre-stored non-driving device location patterns (e.g., pre-stored data including locational movement patterns) to identify the user 140 as a type of vehicle occupant which includes the vehicle driver or the non-driving occupant of the vehicle 102. The one or more driver device location patterns may indicate one or more traditional patterns of locational movements of the portable device 104 that a traditional driver of the vehicle 102 carrying the portable device 104 may utilize as the traditional driver approaches the vehicle 102, as the traditional driver enters the vehicle 102, as the traditional driver is seated within the vehicle 102, and as the portable device 104 carried by the traditional driver is put within a stationary position within the vehicle 102.

The one or more non-driver device location patterns may indicate one or more traditional patterns of locational movements of the portable device 104 that a traditional non-driving occupant of the vehicle 102 carrying the portable device 104 may utilize as the traditional non-driving occupant approaches the vehicle 102, as the traditional non-driving occupant enters the vehicle 102, as the traditional non-driving occupant is seated within the vehicle 102, and as the portable device 104 carried by the traditional non-driving occupant is put within a stationary position.

In other words, the occupant settings application 108 may determine if the RSSI tracking pattern of the portable device 104 is consistent with at least one driver device location pattern that is associated with a typical locational pattern of movement and stationary position of the portable device 104 that is typically carried by a driver of the vehicle 102. For example, the one or more driver device location patterns may be indicative of a travel path of a traditional driver that carries the portable device 104 and approaches a driver's side portion of the vehicle 102, opens a driver's side door 126a of the vehicle 102, enters the vehicle 102 within a doorway of the driver's side door 126a, is seated within a driver's seat 114a of the vehicle 102 and places the portable device 104 within a non-driver seat 114b of the vehicle 102 by moving and crossing the portable device 104 over the center console 116 from the location of the driver's seat 114a to the non-driver seat 114b.

The occupant settings application 108 may also be configured to determine if the RSSI tracking pattern of the portable device 104 is consistent with at least one non-driver device location pattern that is associated with a typical location pattern of movement and the stationary position of the portable device 104 that is typically carried by a non-driving occupant of the vehicle 102. For example, the one or more non-driver device location patterns may be indicative of a traditional non-driving occupant of the vehicle 102 that carries the portable device 104 and approaches a passenger side portion of the vehicle 102, opens a passenger's side door 126*b* of the vehicle 102, enters the vehicle 102 within a doorway of the passenger's side door 126*b*, is seated within a non-driver seat 114*b* of the vehicle 102, and places the portable device 104 within the center console 116 from the location of the non-driver seat 114*b*.

In one embodiment, upon identifying the user 140 as the driver of the vehicle 102 based on the RSSI location tracking of the portable device 104, the occupant settings application 108 may be configured to communicate with the ECU 106 to implement one or more driver settings preset by the user 140 that may be implemented by one or more vehicle systems 128 of the vehicle 102. Alternatively, upon identifying the user 140 as a non-driving occupant of the vehicle 102, the occupant settings application 108 may be configured to communicate with the ECU 106 to implement one or more non-driver settings preset by the user 140 that may be implemented by one or more vehicle systems 128 of the vehicle 102. In some embodiments, the application 108 may further utilize the location tracking to identify a articular non-driver seat 114*b*-114*e* of the vehicle 102 in which the user 140 is seated to implement one or more non-driver settings that may be implemented within a particular region of the vehicle 102 that includes the particular non-driver seat 114*b*-114*e*.

With particular reference to the components of the vehicle 102, the ECU 106 may be configured to include one or more application integrated circuits that may be utilized to complete one or more particular operations of the vehicle 102. In one embodiment, the ECU 106 may be operably connected to the head unit 110, a storage unit 120, a communication unit 122, the vehicle systems 128, and vehicle sensors 124. However, it is to be appreciated that the ECU 106 may be operably connected to numerous additional vehicle components and devices not included within the exemplary environment 100 illustrated in FIG. 1.

Generally, the ECU 106 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 106 and other components, networks, and data sources, of the environment 100.

In one embodiment, the occupant settings application 108 may send one or more command signals to the ECU 106 to operably control one or more of the vehicle systems 114 in accordance with one or more user settings profiles that are associated to one or more individuals that may include one or more drivers and/or one or more non-driving occupants that may have been designated as such by a vehicle owner. As discussed, the ECU 106 is also operably connected for computer communication (e.g., via the bus and/or the I/O interface) to the head unit 110.

The head unit 110 may be connected to one or more display devices (not shown) (e.g., display screens), audio devices (not shown), and haptic devices (not shown) (e.g., haptic steering wheel) that are utilized to provide a human machine interface (not shown). In one or more embodiments, the occupant settings application 108 may be configured to present a user settings interface on one or more display devices of the vehicle 102 and/or on the portable device 104. The occupant settings application 108 may be utilized by the user 140 to create a user settings profile that may be executed to operably control one or more of the vehicle systems 114 of the vehicle 102.

In particular, the user 140 that carries the portable device 104 may utilize the user settings interface to input one or more driver settings that may be saved within the user settings profile associated with the user 140 and may be implemented by one or more of the vehicle systems 128 based on the identification of the user 140 as the driver of the vehicle 102. For example, the one or more driver settings may include, but may not be limited to, driver seat settings, mirror positioning settings, steering wheel positioning settings, acceleration/brake pedal settings, lighting settings, climate control settings, audio settings, and the like.

Additionally, the user 140 that carries the portable device 104 may utilize the user settings interface to input one or more non-driver settings that may be saved within the user settings profile associated with the user 140 and may be implemented by one or more of the vehicle systems 128 based on the identification of the user 140 as the non-driving occupant of the vehicle 102. For example, the one or more non-driver settings may include, but may not be limited to, non-driver seat settings, non-driver climate zone settings, and the like. This functionality may allow the user 140 to customize vehicle settings to be applied by one or more of the vehicle systems 128 of the vehicle 102 when the user 140 carrying the portable device 104 approaches, enters, and/or utilizes the vehicle 102 as a driver or a non-driving occupant of the vehicle 102.

In one embodiment, the ECU 106 and the head unit 110 may be operably connected to the storage unit 120. In alternate embodiments, the storage unit 120 may be included as a component of the head unit 110. The storage unit 120 may store one or more operating systems, associated operating system data, applications, associated application data, vehicle system and subsystem user interface/application data, and the like that are executed by the ECU 106 and/or the head unit 110 of the vehicle 102. In one embodiment, the storage unit 120 may be used by the occupant settings application 108 to store one or more user settings profiles, a list of one or more device identifications of one or more portable devices 104 that are paired to the vehicle 102, one or more driver device location patterns, and one or more non-driver device location patterns that may be pre-stored on the storage unit 120.

In one embodiment, once the user inputs their driver settings and/or non-driver settings to be stored within the user settings profile, the occupant settings application 108 may be configured to communicate with the communication unit 122 to analyze one or more communication signals (e.g., RF polling response signals) received by one or more of the transceivers 112*a*-112*s* to determine the device ID of the portable device 104 included within the communication signal(s). In another embodiment, once the user inputs their respective driver settings and/or non-driver settings, the occupant settings application 108 may be configured to provide an interface that allows the user 140 to input the device ID of the portable device 104.

Upon determining the device ID of the portable device 104 (through the communication signal(s) or through user input), the application 108 may be configured to link the user settings profile to the device ID of the portable device 104. Accordingly, when the application 108 identifies the user 140 as the driver of the vehicle 102 or the non-driving occupant of the vehicle 102 based on the RSSI location tracking of the portable device 104, the user settings profile linked to the device ID associated with the portable device 104 may be accessed by the application 108 to retrieve one or more driver settings or one or more non-driver settings.

In an exemplary embodiment, the ECU 112 and/or the head unit 110 may also be operably connected to the communication unit 122. The communication unit 122 may communicate with one or more components of the operating environment 100 and/or additional systems and components outside of the operating environment 100. The communication unit 122 may include, but is not limited to, one or more transceivers 112a-112s of the vehicle 102 and additional components (not shown) that may be utilized for wired and wireless computer connections and communications via various protocols, as discussed above. As represented in FIG. 1, the transceivers 112a-112s may be disposed at various external and internal portions of the vehicle 102 to capture communication signals received from the portable device 104 at one or more external portions and internal portions of the vehicle 102.

The communication unit 122 may be configured to control operation of one or more of the transceivers 112a-112s to send communication signals (e.g., low frequency (LF) polling signals, radio frequency (RF) signals, Bluetooth® signals, and/or Wi-Fi signals) to be received by the portable device 104 at/near one or more external portions of the vehicle 102 and at/near one or more internal portions of the vehicle 102. Additionally, the communication unit 122 may be configured to control operation of one or more of the transceivers 112a-112s to receive communication signals (e.g., RF polling response signals, LF polling response signals, Bluetooth® signals, and/or Wi-Fi signals).

In one embodiment, the communication unit 122 of the vehicle 102 may utilize one or more of the transceivers 112a-112s to communicate with the portable device 104 by transmitting/receiving RF and LF communication signals. However, it is to be appreciated that the communication unit 122 may utilize one or more of the transceivers 112a-112s and/or additional/alternate components of the vehicle 102 to communicate with the portable device 104 through alternate communication means, including, but not limited to, Bluetooth®, Wi-Fi, and/or similar wireless communication methods.

With continued reference to FIG. 1, as an illustrative example, one or more of the transceivers 112a-112j may be disposed near one or more external portions of the vehicle 102 including but not limited to a front bumper portion, side panel portions, rear bumper portions and/or at one or more external portions of the doors 126a-126d of the vehicle 102 to localize the portable device 104 within an external surrounding area 138 of the vehicle 102. Also, one or more transceivers 112d-112g may be disposed at one or more portions of the vehicle 102 that are located near the doors 126a-126d of the vehicle 102 to localize the portable device 104 near one or more doorways of the vehicle 102. Additionally, one or more of the transceivers 112i-112s may be disposed at internal portions of the vehicle 102 including but not limited to portions of a dash board (not shown), portions of a ceiling (not shown) of the vehicle 102 above the seats 114a-114e, within the seats 114a-114e of the vehicle 102, portions of the ceiling above the doors 126a-126d, within/upon interior portions of the doors 126a-126d, and at other portions of the ceiling and/or floorboard of the vehicle 102 to localize the portable device 104 at/near one or more interior portions of the vehicle 102.

In one embodiment, the communication unit 122 may send one or more commands to one or more of the transceivers 112a-112s to transmit one or more types of signals at one or more signal strengths and at one or more frequencies based on one or more commands received by the communication unit 122 from the occupant settings application 108. In an exemplary embodiment, the one or more transceivers 112a-112s may be capable of providing wireless computer communications utilizing various protocols to be used to send/receive electronic signals internally to components and systems within the vehicle 102 and to external devices including the portable device 104. The transceivers 112a-112s may include respective transmitter antennas (not shown) and receiver antennas (not shown) that may be separate components or may be configured as a single component.

The receipt of one or more communication signals that are received at particular external and internal portions of the vehicle 102 by one or more respective transceivers 112a-112s may be utilized for RSSI location tracking of the portable device 104 as the user 140 carrying the portable device 104 walks towards the vehicle 102 and approaches the vehicle 102, enters the vehicle 102, is seated within the vehicle 102, and the portable device 104 is put within a stationary position (e.g., by placement of the portable device 104 at a particular location of the vehicle 102 by the user 140 or by the user 140 continuing to carry the portable device 104 as they are seated within the vehicle 102).

In one or more embodiments, the transceivers 112a-112s may each include received signal strength threshold values (RSSI threshold values) that may be stored on the storage unit 120 of the vehicle 102. The RSSI threshold values may include respective RSSI signal measurement values (e.g., dBm values) that may be respectively associated with each of the transceivers 112a-112s. As discussed below, one or more of the transceivers 112a-112s may receive polling response signals transmitted by the portable device 104 carried by the user 140, as the user 140 approaches the vehicle 102, enters the vehicle 102, is seated within the vehicle 102, and the portable device 104 is put within a stationary position within the vehicle 102. The occupant settings application 108 may be configured to communicate with the communication unit 122 to determine received signal strength indication values (RSSI values) associated with the respective received RF polling response signals to evaluate the RSSI values against respective RSSI threshold values respectively associated with each of the transceivers 112a-112s.

In one configuration, this evaluation may allow the occupant settings application 108 to determine the locations of the portable device 104 at a plurality of timeframes during which the user 140 carrying the portable device 104 approaches the vehicle 102, enters the vehicle 102, is seated within the vehicle 102, and the portable device 104 is put within a stationary position of the vehicle 102. As discussed, the application 108 may be configured to track the locations of the portable device 104 and provide RSSI tracked locations of the portable device 104 to be aggregated into the RSSI tracking pattern of the portable device 104 that may be compared against one or more driver device location patterns and one or more non-driver device location patterns to thereby identify the user 140 carrying the portable device 104 as a type of vehicle occupant that includes the driver of the vehicle 102 or as the non-driving occupant of the vehicle 102.

With continued reference to FIG. 1, as discussed, the ECU 106 may operably control one or more of the vehicle systems 128 that may include the exemplary vehicle systems discussed above (not individually shown) based on command signal(s) received from the occupant settings application 108. Such signals may be based on the user settings profile associated with the user 140 and the portable device 104. As discussed below, upon identifying the user 140 as the driver of the vehicle 102 based on RSSI tracking of the portable device 104, the occupant settings application 108 may access the user settings profile (based on an associated device ID included within each polling response signal) and may retrieve one or more driver settings (previously inputted by the user 140) from the user settings profile to be executed to control one or more vehicle systems 128 to provide the one or more driver settings. Similarly, if the application 108 identifies the user 140 as a non-driving occupant of the vehicle 102 based on RSSI tracking of the portable device 104, the occupant settings application 108 may access the user settings profile (based on an associated device ID included within each polling response signal) and may retrieve one or more non-driver settings (previously inputted by the user 140) from the user settings profile to be executed to control one or more vehicle systems 128 to provide the one or more non-driver settings.

In one or more embodiments, the vehicle sensors 124 may include, but may not be limited to door sensors (not shown). The vehicle sensors 124 may be configured as capacitive touch sensors, proximity sensors, movement sensors, (lock) actuation sensors, pressure sensors, and the like that may be configured to send respective sensor values based on sensing of various parameters to the ECU 106. With respect to the door sensors, the door sensors maybe configured to determine when an individual approaches a particular door 126a-126d of the vehicle 102 and/or opens or closes the particular door 126a-126d of the vehicle 102.

The door sensors may accordingly be configured to send respective signals to the ECU 106 and/or the occupant settings application 108 when an individual is sensed to approach a particular door 126a-126d and/or open or close a particular door 126a-126d of the vehicle 102. In one embodiment, such signals may be utilized as a trigger for the ECU 106 and/or the application 108 to operably control the communication unit 122 to utilize one or more of the transceivers 112a-112s to transmit one or more polling signals to the portable device 104 and to thereby evaluate RSSI values associated with received polling response signals transmitted by the portable device 104. As discussed, each received polling response signal may be evaluated against RSSI threshold values respectively associated with each of the transceivers 112a-112s to track the RSSI location of the portable device 104 to thereby identify the user 140 as the driver or non-driving occupant of the vehicle 102.

With particular reference to the portable device 104, in one embodiment, the portable device 104 may include, but may not be limited to, an electronic key fob, a smart key, a mobile electronic device, a smart phone, a remote control, and the like. Several functions of the vehicle 102 may be controlled by user input that is provided through the portable device 104 that influence and/or command the ECU 106 to operably control one or more components of the vehicle 102.

In one embodiment, the portable device 104 may include a microprocessor 130 that is utilized to operably control components of the portable device 104. The microprocessor 130 may include memory, an interface circuit, and bus lines, for transferring data, sending commands, communicating with the various components and controlling an overall operation of the portable device 104. In one embodiment, the microprocessor 130 may store the device ID that specifically corresponds to the portable device 104 to be used as an identification mechanism by the vehicle 102 on a memory 136 of the portable device 104. The device ID may be stored as a numerical/alpha-numerical identification (value). As discussed above, the occupant settings application 108 may link the device ID to the user settings profile associated with the user 140 to operably control one or more of the vehicle systems 128 to provide one or more driver settings or non-driver settings based on the identification of the user 140 as the driver or non-driving occupant of the vehicle 102.

In an exemplary embodiment, the portable device 104 may include a transceiver 132 that may send and receive electronic signals to and from the vehicle 102. In particular, the transceiver 132 may receive polling signals (e.g., RF polling signals) that are transmitted by one or more of the transceivers 112a-112s of the vehicle 102. Upon receipt of the polling signals transmitted by the transceiver(s) 112a-112s of the vehicle 102, the transceiver 132 may transmit one or more polling response signals back to the one or more transceivers 112a-112s of the vehicle 102. In an exemplary embodiment, the transceiver 132 may communicate with the vehicle 102 by transmitting/receiving RF communication signals. However, it is to be appreciated that the transceiver 132 and/or additional/alternate components of the portable device 104 may communicate with the vehicle 102 through alternate communication means, including, but not limited to, Bluetooth®, Wi-Fi, and/or similar wireless communication methods.

In one or more embodiments, the microprocessor 130 of the portable device 104 may additionally be operably connected to input buttons 134 of the portable device 104. In some configurations, the input buttons 134 may be utilized to send one or more commands to the vehicle 102 to influence and/or command the ECU 106 to operably control one or more components of the vehicle 102. For example, the user 140 may utilize the input buttons 134 to lock or unlock one or more of the doors 126a-126d of the vehicle 102, open or close one or more windows (not shown) of the vehicle 102, remotely start an engine (not shown) of the vehicle 102, and the like once the portable device 104 is within a communicable range of the vehicle 102.

In one embodiment, upon utilization of the input buttons 134, the transceiver 132 may be configured to send one or more command communication signals to the vehicle 102 to send one or more commands to the vehicle 102 to influence and/or command the ECU 106 to operably control one or more components of the vehicle 102. In an exemplary embodiment, the transceiver 132 may communicate with the vehicle 102 by transmitting/receiving RF command communication signals. However, it is to be appreciated that the transceiver 132 and/or additional/alternate components of the portable device 104 may communicate the command communication signals to the vehicle 102 through alternate communication means, including, but not limited to, Bluetooth®, Wi-Fi, and/or similar wireless communication methods.

In one or more embodiments, upon receipt of one or more command communication signals transmitted by the portable device 104 upon the input of the input buttons 134, the one or more command communication signals may be utilized as a trigger for the occupant settings application 108 to operably control the communication unit 122 to utilize one or more of the transceivers 112a-112s to send one or more polling signals to the portable device 104. The occupant settings application 108 may thereby evaluate RSSI values associated with the received polling response signals transmitted from the portable device 104 to localize the portable device 104 at one or more timeframes as the user 140 approaches the vehicle 102, enters the vehicle 102, is seated within the vehicle 102, and the portable device 104 is put within a stationary position.

In one embodiment, the memory 136 of the portable device 104 may be configured in various memory formats such as, for example L1, L2, or L3 cache or system memory. As such, the memory may include static random access memory (SRAM), dynamic RAM (DRAM), flash memory, read only memory (ROM), or other similar memory devices. The memory 136 may be utilized to store one or more operating systems, applications, associated operating system data, application data, and the like that may be executed by the microprocessor 130 of the portable device 104. In one embodiment, the memory 136 may store the device ID of the portable device 104 and may be accessed by the microprocessor 130 to retrieve the device ID during creation of each command communication signal and/or each polling response signal that may be transmitted by the transceiver 132. Accordingly, during creation of each command communication signal and/or each polling response signal, a data payload packet of each signal may include the device ID that may further be retrieved and analyzed by the communication unit 122 of the vehicle 102 upon receipt of one or more command communication signals and/or polling response signals by one or more transceivers 112a-112s of the vehicle 102.

II. The Occupant Settings Application and Methods Executed by the Application

The general functionality of the occupant settings application 108 will now be discussed. In an exemplary embodiment, the occupant settings application 108 may be executed by the ECU 106 of the vehicle 102 and/or the head unit 110 of the vehicle 102 based on application data that may be stored on the storage unit 120 of the vehicle 102. The occupant settings application 108 may additionally be executed by the microprocessor 130 of the portable device 104 based on application data that may be stored on the memory 136 of the portable device 104. In some embodiments, the occupant settings application 108 may be stored on an externally hosted computing infrastructure and may be executed by the vehicle 102 and/or the portable device 104 based on computer communications between the communication unit 122, the transceiver 132, and a communication device (not shown) associated with the externally hosted computing infrastructure.

Figure 2:
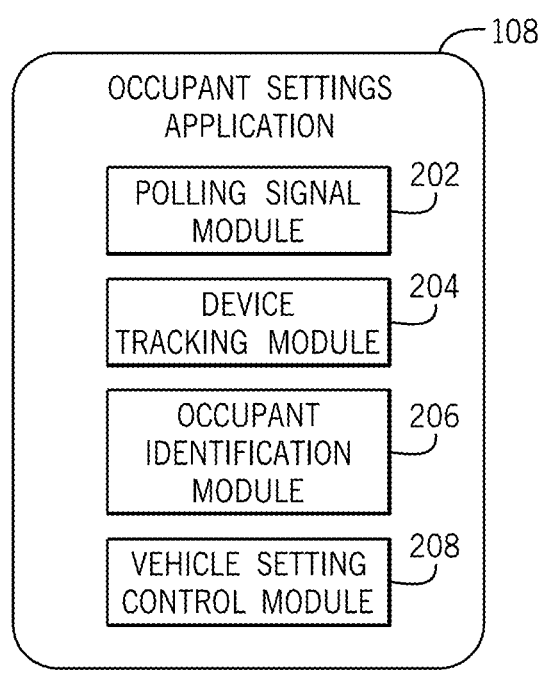
FIG. 2 is a schematic view of the occupant settings application according to an exemplary embodiment of the present disclosure.

FIG. 2 is a schematic view of the occupant settings application 108 according to an exemplary embodiment of the present disclosure. In an exemplary embodiment, the occupant settings application 108 may include a polling signal module 202, a device tracking module 204, an occupant identification module 206, and a vehicle settings control module 208. However, it is to be appreciated that the occupant settings application 108 may include one or more additional modules and/or sub-modules that are included in addition to the modules 202-208. Methods and examples describing process steps that are executed by the modules 202-208 shown in FIG. 2 will now be described in more detail.

Figure 3:
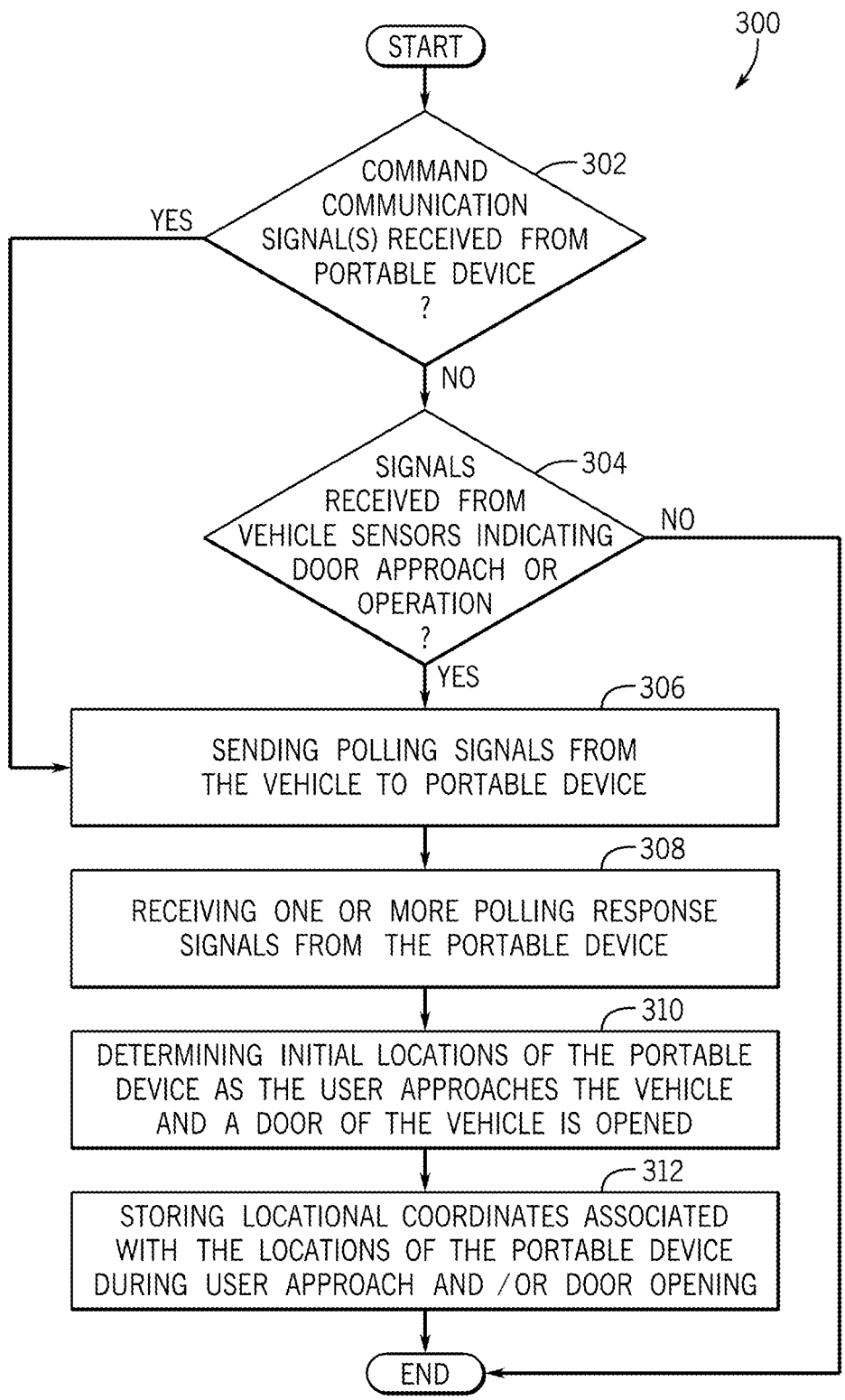
FIG. 3 is a process flow diagram of a method for determining one or more initial locations of the portable device when the user approaches the vehicle and/or at least one door of the vehicle is opened according to an exemplary embodiment.

FIG. 3 is a process flow diagram of a method 300 for determining one or more initial locations of the portable device 104 when the user 140 approaches the vehicle 102 and/or at least one door 126a-126d of the vehicle 102 is opened according to an exemplary embodiment. FIG. 3 will be described with reference to the components of FIG. 1 and FIG. 2 though it is to be appreciated that the method of FIG. 3 may be used with other systems and/or components. The method 300 may begin at block 302, wherein the method 300 may include determining if a command communication signal(s) is received from the portable device 104.

In an exemplary embodiment, the polling signal module 202 may be configured to determine when the communication unit 122 of the vehicle 102 should be utilized to employ one or more of the transceivers 112a-112s of the vehicle 102 to transmit polling signals to the portable device 104. The polling signal module 202 may thereby be utilized to ensure that the communication unit 122 is not constantly employing one or more of the transceivers 112a-112s to transmit polling signals even in circumstances in which the portable device 104 is not in a communicable distance from the vehicle 102. This functionality may thereby reduce power consumption with respect to a battery (not shown) or alternative power source of the vehicle 102.

In one embodiment, the polling signal module 202 may communicate with the communication unit 122 to determine if one or more of the transceivers 112a-112s of the vehicle 102 has received one or more command communication signals from the portable device 104. As discussed above, the one or more command communication signals may be transmitted by the transceiver 132 of the portable device 104 upon the receipt of one or more user inputs upon the input buttons 134 of the portable device 104.

If it is determined that the command communication signal(s) are not received from the portable device 104 (at block 302), the method 300 may proceed to block 304, wherein the method 300 may include determining if signals are received by the vehicle sensors 124 indicating door operation. In an exemplary embodiment, the polling signal module 202 may communicate with the vehicle sensors 124 of the vehicle 102 to determine if the user 140 is approaching a door(s) 126a-126d of the vehicle 102 or the door(s) 126a-126d are being operated to open or close. As discussed above, the vehicle sensors 124 may include door sensors that may be configured to determine when an individual approaches a particular door 126a-126d of the vehicle 102 and/or opens or closes one or more doors 126a-126d of the vehicle 102. The vehicle sensors 124 may accordingly be configured to send respective signals to the polling signal module 202 when an individual is sensed to approach a particular door(s) 126a-126d and/or opens or closes a particular door(s) 126a-126d of the vehicle 102.

If it is determined that the command communication signal(s) are received from the portable device 104 (at block 302) or if signals are received by the vehicle sensors 124 indicating door operation (at block 304), the method 300 may proceed to block 306, wherein the method 300 may include sending polling signals from the vehicle 102 to an external surrounding area 138 of the vehicle 102. In an exemplary embodiment, upon determining that the user 140 has provided a user input(s) to the input buttons 134 of the portable device 104 to control an operation of the vehicle 102 or that the user 140 is approaching or operating a particular door(s) 126a-126s of the vehicle 102, the polling signal module 202 may send a command signal(s) to the communication unit 122 to initiate transmission of one or more polling signals by the one or more of the transceivers 112a-112s of the vehicle 102 that may be disposed at external and/or internal portions of the vehicle 102 and may be configured to transmit polling signals that may reach the external surrounding area 138 around the vehicle 102.

The communication unit 122 may be configured to control one or more of the transceivers 112a-112s to transmit a predetermined number of polling signals within a predetermined time period. In an alternate embodiment, the polling signal module 202 may send a command signal(s) to the communication unit 122 to initiate transmission of one or more polling signals by a subset of the transceivers 112a-

112s of the vehicle 102 based on the location of the transceivers 112a-112s with respect to the vehicle 102 to determine if the portable device 104 has been quickly moved from the external surrounding area 138 of the vehicle 102 to an internal portion of the vehicle 102.

In one embodiment, the polling signal module 202 may continue to send command signals for the communication unit 122 to utilize one or more of the transceivers 112a-112s to send polling signals until the occupant settings application 108 determines that the portable device 104 is put within a stationary position within the vehicle 102. In other words, one or more of the transceivers 112a-112s may be employed to send the polling signals to thereby receive polling response signals from the portable device 104 to track the locations of the portable device 104 during the user's approach to the vehicle 102, the user's entrance within the vehicle 102, the user 140 being seated within the vehicle 102, and as the portable device 104 is put within a stationary position (e.g., the portable device 104 is no longer being moved as the user 140 who carries the portable device 104 is in a fixed location (e.g., seated within a seat 114a, 114b) or places the portable device 104 within a particular location of the vehicle 102.

In some embodiments, the communication unit 122 may be configured to control one or more of the transceivers 112a-112s to transmit high power polling signal(s) at a predetermined low frequency and/or high power level as the user 140 is approaching the vehicle 102 and is determined to be located outside of the vehicle 102. The communication unit 122 may be further configured to control one or more of the transceivers 112a-112s to transmit low power polling signal(s) at a predetermined high frequency and/or low power level as the user 140 enters the vehicle 102 and is determined to be located within the vehicle 102.

The method 300 may proceed to block 308, wherein the method 300 may include receiving one or more polling response signals from the portable device 104. In an exemplary embodiment, if the portable device 104 is within the external surrounding area 138 of the vehicle 102, the transceiver 132 of the portable device 104 may receive one or more polling signals transmitted by one or more of the transceivers 112a-112s of the vehicle 102. Upon receipt of the one or more polling signals, the transceiver 132 may be configured to communicate data pertaining to the receipt of the polling signal(s) to the microprocessor 130 and/or the polling signal module 202. The polling signal module 202 may thereby communicate command signal(s) to the transceiver 132 to transmit one or more polling response signals to be received by the vehicle 102.

In one embodiment, upon receipt of each polling response signal by one or more transceivers 112a-112s of the vehicle 102, the polling signal module 202 may communicate data that pertains to one or more transceivers 112a-112j of the vehicle 102 that may be disposed at locations that may be located near external portions of the vehicle 102 such as fenders, front bumper, and doors 126a-126d of the vehicle 102 and may be configured to specifically receive polling response signals from the portable device 104 when it is located within the external surrounding area 138 of the vehicle 102.

Accordingly, upon transmitting one or more polling response signals from the portable device 104 to the vehicle 102, one or more of the transceivers 112a-112j of the vehicle 102 may be configured to receive the one or more polling response signals sent by the portable device 104 as the user 140 carries the portable device 104 within the external surrounding area 138 of the vehicle 102. The one or more transceivers 112a-112j may thereby communicate data pertaining to the receipt of the one or more polling response signals that are received from the portable device 104. As discussed, each polling response signal may include a data packet that contains the device ID of the portable device 104. In one embodiment, upon receipt of each polling response signal by one or more of the transceivers 112a-112j, the polling signal module 202 may thereby be configured to extract the device ID of the portable device 104 from the data payload packet of each signal to be further evaluated.

The method 300 may proceed to block 310, wherein the method 300 may include determining locations of the portable device 104 as the user 140 approaches the vehicle 102 and/or upon the user 140 opening a door 126a-126d of the vehicle 102. In one embodiment, upon receipt of each polling response signal by one or more transceivers 112a-112j of the vehicle 102, the polling signal module 202 may communicate data that pertains to one or more particular transceivers 112a-112j that receive the one or more polling response signals. In one configuration, upon the receipt of the data pertaining to the one or more particular transceivers 112a-112j that receive the one or more polling response signals, the device tracking module 204 may be configured to communicate with the communication unit 122 to determine the RSSI value(s) associated with the one or more polling response signals received by one or more of the particular transceivers 112a-112j.

In an exemplary embodiment, the device tracking module 204 may be configured to access the storage unit 120 and retrieve respective RSSI threshold values associated with each of the one or more particular transceivers 112a-112j that receive the one or more polling response signals. The device tracking module 204 may thereby compare each RSSI value associated with each of the one or more polling response signals to the respective RSSI threshold values associated with each of the one or more particular transceivers 112a-112j that received the one or more polling response signals. In one embodiment, if the RSSI value associated with the polling response signal(s) meets or exceeds the respective RSSI threshold values associated with each of the one or more particular transceivers 112a-112j, the device tracking module 204 may determine that the location of the portable device 104 is within a particular proximity of the respective transceiver(s) 112a-112j.

In some embodiments, if the portable device 104 is determined to be within a particular (close to equal) proximity of the more than one of the transceivers 112a-112j, the device tracking module 204 may communicate with the communication unit 122 to determine which one of the transceivers 112a-112j is receiving the polling response signal(s) with the highest signal strength. The device tracking module 204 may accordingly determine that the location of the portable device 104 is within a particular proximity of one of the respective transceivers 112a-112j that receives the polling response signal(s) with the highest signal strength as the user 140 approaches the vehicle 102 and/or upon the user 140 opening a door 126a-126d of the vehicle 102.

In one or more embodiments, the device tracking module 204 may accordingly determine and track the locations of the portable device 104, as the user 140 carrying the portable device 104 approaches the vehicle 102 and one or more of the doors of the vehicle 102 is opened based on the RSSI value of the polling response signal(s) meeting or exceeding the respective RSSI threshold values associated with each of the one or more particular transceivers 112a-112j and/or one of the transceivers 112a-112j receiving the polling response signal(s) with the highest signal strength.

The method 300 may proceed to block 312, wherein the method 300 may include storing locational coordinates associated with the locations of portable device 104 as the user 140 approaches the vehicle 102 and/or a particular door 126a-126d of the vehicle 102 is opened. In one embodiment, upon tracking the locations of the portable device 104, the device tracking module 204 may utilize a grid model of the surrounding environment of the vehicle 102 and the interior portions of the vehicle 102 to determine locational coordinates that are associated with each of the tracked locations of the portable device 104 as the user 140 approaches the vehicle 102 and/or opens a door 126a-126d of the vehicle 102.

In one embodiment, the grid model may include geopositional x, y locational coordinates that correspond to specific locations within the external surrounding area 138 of the vehicle 102 and the interior portions of the vehicle 102. In an exemplary embodiment, the device tracking module 204 may be configured to access the storage unit 120 of the vehicle 102 and may store locational coordinates associated with each of the tracked locations of the portable device 104 as the user 140 approaches the vehicle 102 and/or opens a door 126a-e of the vehicle 102.

Figure 4:
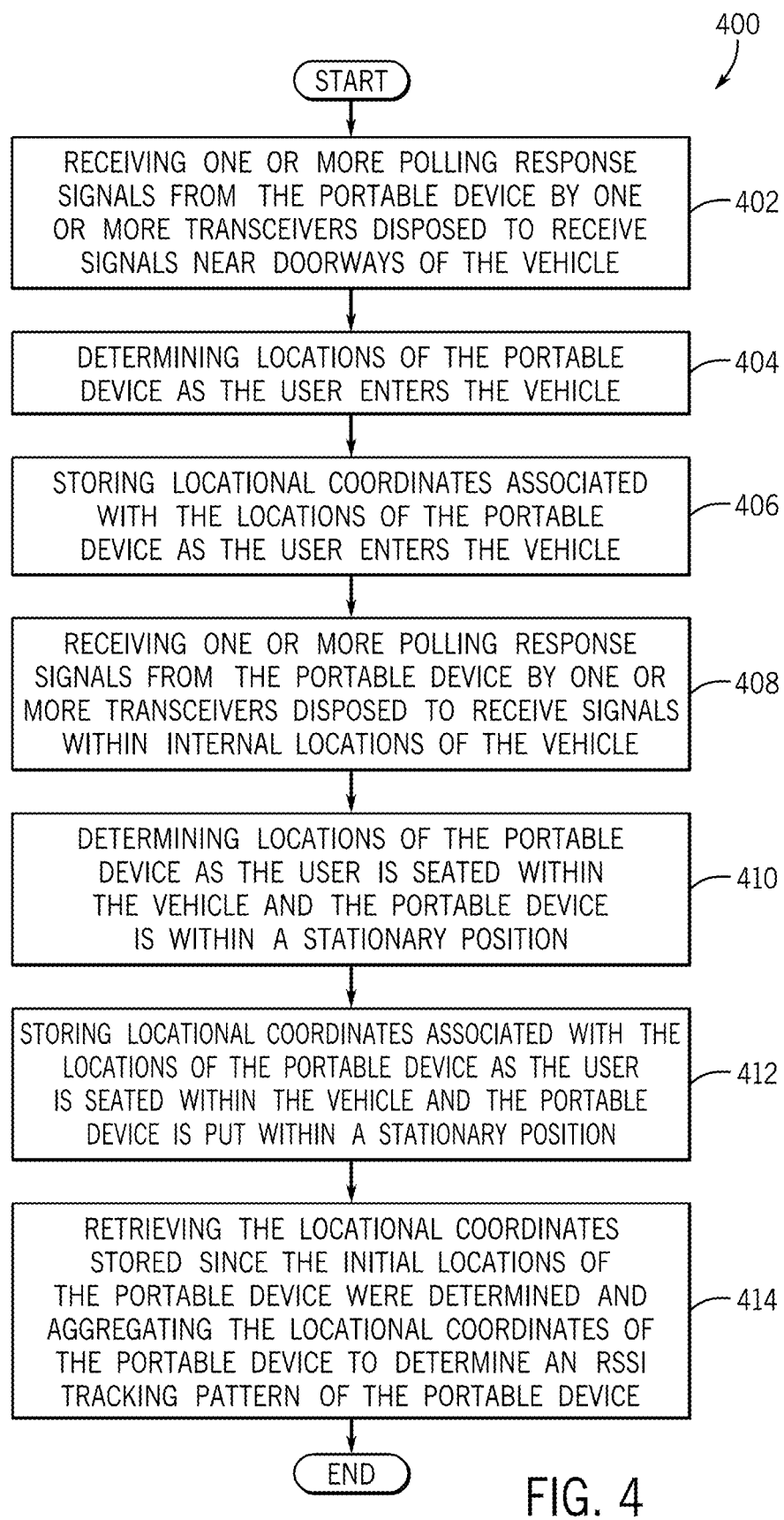
FIG. 4 is a process flow diagram of a method for determining an RSSI tracking pattern of the portable device according to an exemplary embodiment of the present disclosure.

FIG. 4 is a process flow diagram of a method 400 for determining an RSSI tracking pattern of the portable device 104 according to an exemplary embodiment of the present disclosure. FIG. 4 will be described with reference to the components of FIG. 1 and FIG. 2 though it is to be appreciated that the method of FIG. 4 may be used with other systems and/or components. The method 400 may begin at block 402, wherein the method 400 may include receiving one or more polling response signals from the portable device 104 by one or more transceivers 112d-112g disposed to receive signals near doorways of the vehicle 102.

In one embodiment, the polling signal module 202 may be configured to continue to send command signals for the communication unit 122 to utilize one or more of the transceivers 112a-112s to send polling signals to the portable device 104 until the occupant settings application 108 determines that the portable device 104 is put within a stationary position within the vehicle 102. Accordingly, upon receipt of the one or more polling signals, the transceiver 132 may be configured to communicate data pertaining to the receipt of the polling signal(s) to the microprocessor 130 and/or the polling signal module 202. The polling signal module 202 may thereby communicate command signal(s) to the transceiver 132 to transmit one or more polling response signals to be received by one or more transceivers 112a-112f of the vehicle 102 that may be located close to the doors 126a-126d of the vehicle 102.

In one embodiment, upon transmitting one or more polling response signals from the portable device 104 to the vehicle 102, one or more transceivers 112d-112g of the vehicle 102 may be configured to receive the one or more polling response signals. The one or more transceivers 112d-112g may thereby communicate data pertaining to the receipt of the one or more polling response signals that are received from the portable device 104.

The method 400 may proceed to block 404, wherein the method 400 may include determining locations of the portable device 104 as the user 140 enters the vehicle 102. In one embodiment, upon receipt of each RF polling response signal by one or more transceivers 112d-112g of the vehicle 102, the polling signal module 202 may communicate data that pertains to one or more transceivers 112d-112g that are disposed closest to the doors 126a-126d of the vehicle 102 to determine if one or more of the transceivers 112d-112g receive the one or more polling response signals.

In one configuration, upon the receipt of the data pertaining to the one or more particular transceivers 112d-112g that are disposed closest/near to one or more of the doors 126a-126d of the vehicle 102 that receive the one or more polling response signals, the device tracking module 204 may be configured to communicate with the communication unit 122 to determine the RSSI value(s) associated with the one or more polling response signals received by one or more of the particular transceivers 112d-112g that are disposed closest to the doors 126a-126d.

In an exemplary embodiment, the device tracking module 204 may be configured to access the storage unit 120 and retrieve respective RSSI threshold values associated with each of the one or more particular transceivers 112d-112g that receive the one or more polling response signals. The device tracking module 204 may thereby compare each RSSI value associated with each of the one or more polling response signals to the respective RSSI threshold values associated with each of the one or more particular transceivers 112d-112g disposed closest to the doors 126a-126d that received the one or more polling response signals. In one embodiment, if the RSSI value associated with the polling response signal(s) meets or exceeds the respective RSSI threshold values associated with each of the one or more particular transceivers 112d-112g, the device tracking module 204 may determine that the location of the portable device 104 is within a particular proximity of the respective transceivers 112d-112g and a particular doorway of the vehicle 102 associated with the particular door 126a-126d as the user 140 enters the vehicle 102.

In one embodiment, if the portable device 104 is determined to be within a particular proximity of the more than one of the transceivers 112d-112g, the device tracking module 204 may communicate with the communication unit 122 to determine which one of the transceivers 112d-112g is receiving the polling response signal(s) with the highest signal strength. The device tracking module 204 may accordingly determine that the location of the portable device 104 is within a particular proximity of one of the respective transceivers 112d-112g that receives the polling response signal(s) with the highest signal strength and a particular doorway of the vehicle 102 associated with the particular door 126a-126d as the user 140 enters the vehicle 102.

In one or more embodiments, the device tracking module 204 may accordingly determine and track the locations of the portable device 104 as the user 140 carrying the portable device 104 enters the vehicle 102 based on the RSSI value of the polling response signal(s) meeting or exceeding the respective RSSI threshold values associated with each of the one or more particular 112d-112g receiving the polling response signal(s) with the highest signal strength. In other words, the device tracking module 204 may accordingly determine and track the locations of the portable device 104, as the portable device 104 is moved from an external surrounding area 138 of the vehicle 102 to an internal portion within the vehicle 102.

The method 400 may proceed to block 406, wherein the method 400 may include storing locational coordinates associated with the locations of the portable device 104 as the user 140 enters the vehicle 102. In one embodiment, upon tracking the locations of the portable device 104 as the user 140 carrying the portable device 104 enters the vehicle 102, the device tracking module 204 may utilize the grid model of the surrounding environment of the vehicle 102 and the interior portions of the vehicle 102 to determine locational coordinates that are associated with each of the tracked locations of the portable device 104 as the user 140 enters the vehicle 102.

As discussed, the grid model may include geo-positional x, y locational coordinates that correspond to specific locations within the external surrounding area 138 of the vehicle 102 and the interior portions of the vehicle 102. In an exemplary embodiment, the device tracking module 204 may be configured to access the storage unit 120 of the vehicle 102 and may store locational coordinates associated with each of the tracked locations of the portable device 104 as the user 140 enters the vehicle 102.

The method 400 may proceed to block 408, wherein the method 400 may include receiving one or more polling response signals sent from the portable device 104 by one or more transceivers 112i-112s disposed at internal portions of the vehicle 102 and configured to receive signals within internal portions of the vehicle 102. As discussed above, the polling signal module 202 may be configured to continue to send command signals for the communication unit 122 to utilize one or more of the transceivers 112a-112s to send polling signals to the portable device 104 until the occupant settings application 108 determines that the portable device 104 is put within a stationary position within the vehicle 102. In one embodiment, upon transmitting one or more polling response signals from the portable device 104 to the vehicle 102, one or more transceivers 112i-112s that may be disposed within internal portions of the vehicle 102 may be configured to receive the one or more polling response signals. The one or more transceivers 112i-112s may thereby communicate data pertaining to the receipt of the one or more polling response signals that are received from the portable device 104.

The method 400 may proceed to block 410, wherein the method 400 may include determining locations of the portable device 104 as the user 140 is seated within the vehicle 102 and the portable device 104 is put within a stationary position. In one embodiment, upon receipt of each RF polling response signal by one or more transceivers 112i-112s of the vehicle 102, the polling signal module 202 may communicate data that pertains to one or more transceivers 112i-112s that are disposed within the internal portions of the vehicle 102.

In one configuration, upon the receipt of the data pertaining to the one or more particular transceivers 112i-112s that are disposed within the internal portions of the vehicle 102 that receive the one or more polling response signals, the device tracking module 204 may be configured to communicate with the communication unit 122 to determine the RSSI value(s) associated with the one or more polling response signals received by one or more of the particular transceivers 112i-112s that are disposed within the internal portions of the vehicle 102.

In an exemplary embodiment, the device tracking module 204 may be configured to access the storage unit 120 and retrieve respective RSSI threshold values associated with each of the one or more particular transceivers 112i-112s that receive the one or more polling response signals. The device tracking module 204 may thereby compare each RSSI value associated with each of the one or more polling response signals to the respective RSSI threshold values associated with each of the one or more particular transceivers 112i-112s that are disposed within the internal portions of the vehicle 102 and that received the one or more polling response signals.

In one embodiment, if the RSSI value associated with the polling response signal(s) meets or exceeds the respective RSSI threshold values associated with each of the one or more particular transceivers 112i-112s, the device tracking module 204 may determine that the location of the portable device 104 is within a particular proximity of the respective transceivers 112i-112s that may indicate that the locations of the portable device 104 are near one of the seats 114a-114e of the vehicle 102 as its moved within the vehicle 102 and/or the stationary position of the portable device 104 is within or near one of the seats 114a-114e of the vehicle 102, the center console 116 of the vehicle 102, the glove compartment 118 of the vehicle 102, or another internal portion of the vehicle 102.

For example, the stationary position may be included within the user's pocket as the user 140 is seated within a particular seat 114a-114e of the vehicle 102, a particular non-driver seat 114b-114e of the vehicle 102 based on the user's placement of the portable device 104 (e.g., or a bag containing the portable device 104), within the center console 116 (e.g., storage container) of the vehicle 102 based on the user's placement of the portable device 104, or within the glove compartment 118 of the vehicle 102 based on the user's placement of the portable device 104. It is to be appreciated that additional internal portions of the vehicle 102 may be included as an internal portion at which the portable device 104 is put within a stationary position within the vehicle 102 (e.g., door compartment, seat pocket, dash board compartment, floor compartment, ceiling compartment).

In one embodiment, if the portable device 104 is determined to be within a particular proximity of the more than one of the transceivers 112i-112s, the device tracking module 204 may communicate with the communication unit 122 to determine which one of the transceivers 112i-112s is receiving the polling response signal(s) with the highest signal strength. The device tracking module 204 may accordingly determine that the location of the portable device 104 is within a particular proximity of one of the respective transceivers 112i-112s that receives the polling response signal(s) with the highest signal strength as the user 140 is seated within the vehicle 102 and the portable device 104 is put within a stationary position within the vehicle 102.

In one or more embodiments, the device tracking module 204 may accordingly determine and track the locations of the portable device 104 as the user 140 carrying the portable device 104 is seated within the vehicle 102 based on the RSSI value of the polling response signal(s) meeting or exceeding the respective RSSI threshold values associated with each of the one or more particular transceivers 112i-112s and/or one of the transceivers 112i-112s receiving the polling response signal(s) with the highest signal strength. In other words, the device tracking module 204 may accordingly determine and track the locations of the portable device 104 as the portable device 104 is put within a stationary position within an internal portion within the vehicle 102.

The method 400 may proceed to block 412, wherein the method 400 may include storing locational coordinates associated with the locations of the portable device 104 as the user 140 is seated within the vehicle 102 and the portable device 104 is put within a stationary position. In one embodiment, upon tracking the locations of the portable device 104 as the user 140 carrying the portable device 104 is seated within the vehicle 102 and the portable device 104 is put within a stationary position with an internal portion of the vehicle 102, the device tracking module 204 may utilize the grid model of the surrounding environment of the vehicle 102 and the interior portions of the vehicle 102 as the user 140 carrying the portable device 104 is seated within the vehicle 102 and the portable device 104 is put within a stationary position within an internal portion of the vehicle 102. In an exemplary embodiment, the device tracking module 204 may be configured to access the storage unit 120 of the vehicle 102 and may store locational coordinates associated with each of the tracked locations of the portable device 104 as the user 140 carrying the portable device 104 is seated within the vehicle 102 and the portable device 104 is put within a stationary position within an internal portion of the vehicle 102.

The method 400 may proceed to block 414, wherein the method 400 may include retrieving the locational coordinates stored since the initial locations of the portable device 104 were determined and aggregating the locational coordinates of the portable device 104 to determine a RSSI tracking pattern of the portable device 104. In an exemplary embodiment, upon storing locational coordinates with the locations of the portable device 104 as the user 140 is seated within the vehicle 102 and the portable device 104 is put within a stationary position, the device tracking module 204 may be configured to access the storage unit 120 of the vehicle 102 to retrieve the locational coordinates associated with the initial locations of the portable device 104 as the user 140 approaches the vehicle 102 and/or a door 126a-126e of the vehicle 102 is opened (as stored at block 312), the locational coordinates associated with the locations of the portable device 104 as the user 140 enters the vehicle 102 (as stored at block 406), and the locational coordinates associated with the locations of the portable device 104 as the user 140 is seated within the vehicle 102 and the portable device 104 is put within a stationary position (as stored at block 412).

Upon retrieval of the locational coordinates stored since the initial locations of the portable device 104 were determined, the occupant settings application 108 may be configured to aggregate (e.g., merge, link) the locational coordinates of the portable device 104 into the RSSI tracking pattern of the portable device 104. The RSSI tracking pattern may accordingly include a tracked path (e.g., string of locational coordinates) of the portable device 104 the user 140 approaches the vehicle 102 (from the external surrounding area 138 of the vehicle 102), the user 140 enters the vehicle 102, the user 140 is seated within the vehicle 102, and when the user 140 continues to carry the portable device 104 in a fixed location or places the portable device 104 within a particular area (e.g., pocket, seat 114a-114e, center console 116, glove compartment 118), of the vehicle 102. Upon determining the RSSI tracking pattern of the portable device 104, the device tracking module 204 may communicate respective data that pertains to the RSSI tracking pattern to the occupant identification module 206 of the occupant settings application 108.

Figure 5:
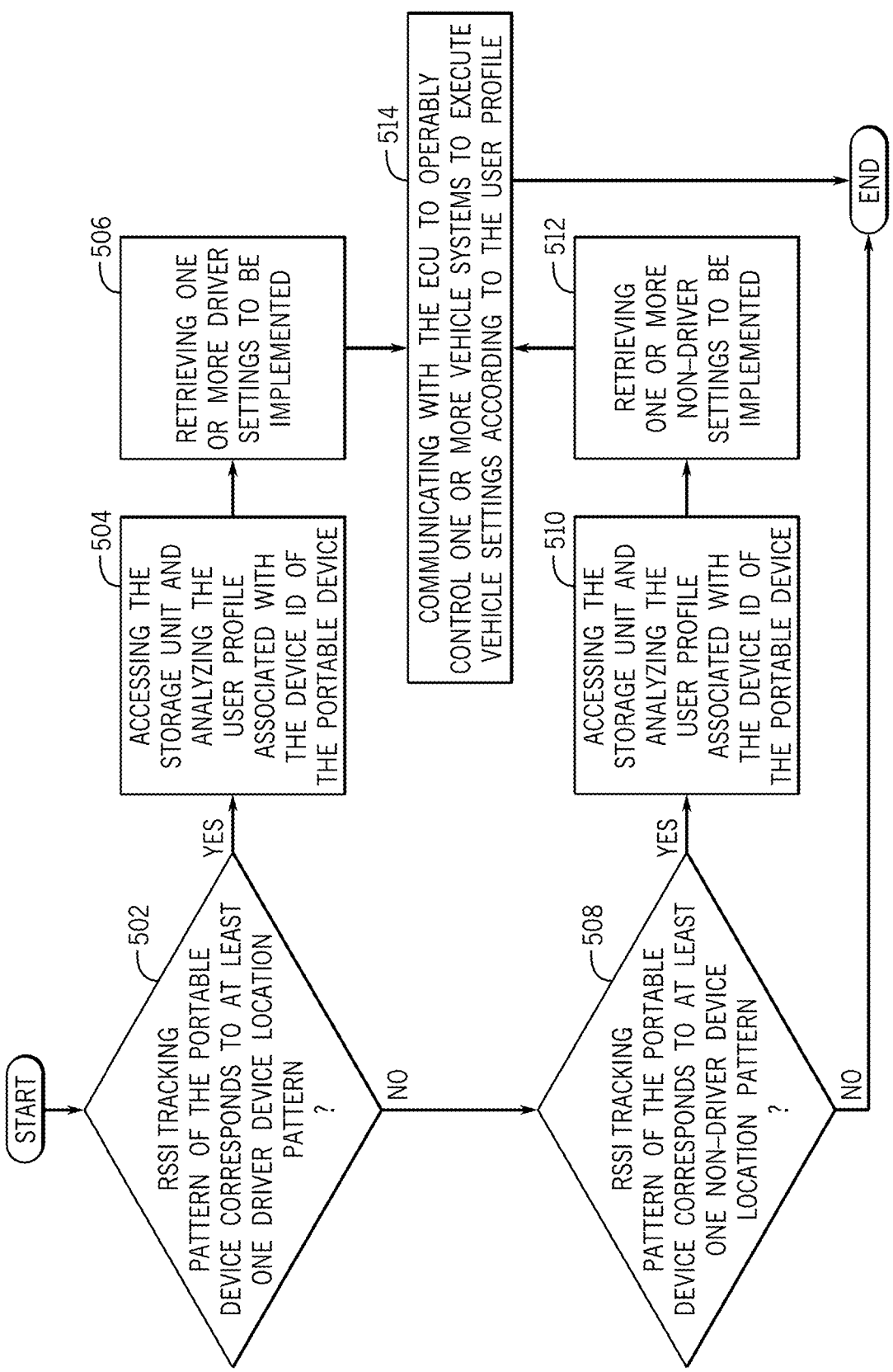
FIG. 5 is a process flow diagram of a method for identifying the user as a driver or non-driving occupant of the vehicle and executing vehicle settings according to an exemplary embodiment of the present disclosure.

FIG. 5 is a process flow diagram of a method 500 for identifying the user 140 as a driver or non-driving occupant of the vehicle 102 and executing vehicle settings according to an exemplary embodiment of the present disclosure. FIG. 5 will be described with reference to the components of FIG. 1 and FIG. 2 though it is to be appreciated that the method of FIG. 5 may be used with other systems and/or components. The method 500 may begin at block 502, wherein the method 500 may include determining if the RSSI tracking pattern of the portable device 104 corresponds to at least one driver device location pattern.

As discussed above, the storage unit 120 may be used by the occupant settings application 108 to store one or more driver device location patterns and one or more non-driver device location patterns that may be pre-stored on the storage unit 120. In one embodiment, the upon receiving respective data that pertains to the RSSI tracking pattern of the portable device 104, the occupant identification module 206 may be configured to access the storage unit 120 and retrieve the one or more driver device location patterns. The occupant identification module 206 may thereby compare the locations of the portable device 104 that correspond with the RSSI tracking pattern of the portable device 104 against the one or more driver device location patterns to determine if the RSSI tracking pattern of the portable device 104 corresponds to at least one driver device location pattern.

Stated differently, the occupant identification module 206 may access the storage unit 120 to retrieve the one or more driver device location patterns that may be indicative of one or more traditional patterns of locational movements of the portable device 104 as a traditional driver of the vehicle 102 carrying the portable device 104 approaches the vehicle 102, as the traditional driver enters the vehicle 102, as the traditional driver is seated within the vehicle 102, and as the portable device 104 is put within a stationary position within the vehicle 102. The occupant identification module 206 may thereby compare the RSSI tracking pattern of the portable device 104 pertaining to the locational movements of the portable device 104 as the user 140 approaches the vehicle 102, enters the vehicle 102, is seated within the vehicle 102, and the portable device 104 is put within a stationary position against the one or more driver device location patterns to determine if the RSSI tracking pattern of the portable device 104 corresponds to at least one driver device location pattern.

If it is determined that the RSSI tracking pattern of the portable device 104 corresponds to at least one driver device location pattern (at block 502), the method 500 may proceed to block 504, wherein the method 500 may include accessing the storage unit 120 and analyzing the user profile associated with the device ID of the portable device 104. As discussed above, upon receipt of each of the polling response signals transmitted by the portable device 104, the polling signal module 202 may thereby be configured to extract the device ID of the portable device 104 from the data payload packet of each signal to be further evaluated. The polling signal module 202 may thereby communicate the device ID to the vehicle settings control module 208.

In an exemplary embodiment, the vehicle settings control module 208 may be configured to access the storage unit 120 of the vehicle 102 and query the storage unit 120 to retrieve the user settings profile that is associated with the device ID of the portable device 104. As discussed above, the user settings profile may be created by the user 140 that uses the portable device 104 through the user settings interface to input one or more driver settings and/or non-driver settings that may be saved within the user settings profile associated with the device ID of the portable device 104. Upon retrieving the user settings profile, the vehicle settings control module 208 may analyze the user settings profile to determine one or more driver settings that may be included within the user profile as previously inputted by the user 140.

The method 500 may proceed to block 506, wherein the method 500 may include retrieving one or more driver settings to be implemented. In an exemplary embodiment, upon determining one or more driver settings that may be included within the user settings profile, the vehicle settings control module 208 may retrieve data associated with the one or more driver settings to be implemented by one or more of the vehicle systems 114 of the vehicle 102. Upon retrieving the one or more driver settings, the vehicle settings control module 208 may determine one or more particular vehicle systems 114 that may be utilized to provide one or more driver settings as retrieved by the vehicle settings control module 208.

Referring again to block 502, if it is determined that the RSSI tracking pattern of the portable device 104 does not correspond to at least one driver device location pattern, the method 500 may proceed to block 508, wherein the method 500 may include determining if the RSSI tracking pattern of the portable device 104 corresponds to at least one non-driver device location pattern. As discussed above, the storage unit 120 may be used by the occupant settings application 108 to store one or more non-driver device location patterns that may be pre-stored on the storage unit 120.

In one embodiment, the upon receiving respective data that pertains to the RSSI tracking pattern of the portable device 104, the occupant identification module 206 may be configured to access the storage unit 120 and retrieve the one or more non-driver device location patterns. The occupant identification module 206 may thereby compare the locations of the portable device 104 that correspond with the RSSI tracking pattern of the portable device 104 against the one or more non-driver device location patterns to determine if the RSSI tracking pattern of the portable device 104 corresponds to at least one non-driver device location pattern.

Stated differently, the occupant identification module 206 may access the storage unit 120 to retrieve the one or more non-driver device location patterns that may be indicative of one or more traditional patterns of locational movements of the portable device 104 as a traditional non-driving occupant of the vehicle 102 carrying the portable device 104 approaches the vehicle 102, as the traditional non-driver occupant enters the vehicle 102, as the traditional non-driving occupant is seated within the vehicle 102, and as the portable device 104 is put within a stationary position. The occupant identification module 206 may thereby compare the RSSI tracking pattern of the portable device 104 pertaining to the locational movements of the portable device 104 as the user 140 approaches the vehicle 102, enters the vehicle 102, is seated within the vehicle 102, and the portable device 104 is put within a stationary position against the one or more non-driver device location patterns to determine if the RSSI tracking pattern of the portable device 104 corresponds to at least one non-driver device location pattern.

If it is determined that the RSSI tracking pattern of the portable device 104 corresponds to at least one non-driver device location pattern (at block 508), the method 500 may proceed to block 510, wherein the method 500 may include accessing the storage unit 120 and analyzing the user profile associated with the device ID of the portable device 104. In an exemplary embodiment, the vehicle settings control module 208 may be configured to access the storage unit 120 of the vehicle 102 and query the storage unit 120 to retrieve the user settings profile that is associated with the device ID of the portable device 104.

As discussed above, the user settings profile may be created by the user 140 that uses the portable device 104 through the user settings interface to input one or more driver settings and/or non-driver settings that may be saved within the user settings profile associated with the device ID of the portable device 104 and user 140. Upon retrieving the user settings profile, the vehicle settings control module 208 may analyze the user settings profile to determine one or more non-driver settings that may be included within the user profile as previously inputted by the user 140.

The method 500 may proceed to block 512, wherein the method 500 may include retrieving one or more non-driver settings to be implemented. In an exemplary embodiment, upon determining one or more non-driver settings that may be included within the user settings profile, the vehicle settings control module 208 may retrieve data associated with the one or more non-driver settings to be implemented by one or more of the vehicle systems 114 of the vehicle 102. Upon retrieving the one or more non-driver settings, the vehicle settings control module 208 may determine one or more particular vehicle systems 114 that may be utilized to provide one or more non-driver settings as retrieved by the vehicle settings control module 208.

The method 500 may proceed to block 514, wherein the method 500 may include communicating with the ECU 106 to operably control one or more of the vehicle systems 114 to execute vehicle settings according to the user profile. Upon retrieving one or more driver settings (at block 506) or upon retrieving one or more non-driver settings (at block 512), the vehicle settings control module 208 may communicate with the ECU 106 to operably control one or more of the vehicle systems 114 to provide one or more vehicle driver settings or one or more non-driver settings based on the identification of the user 140 as the driver of the vehicle 102 or the non-driving occupant of the vehicle 102. Accordingly, as the user 140 is seated within the vehicle 102, one or more of the vehicle systems 114 may provide one or more of the driver settings and/or non-driver settings as pre-inputted by the user 140.

Figure 6:
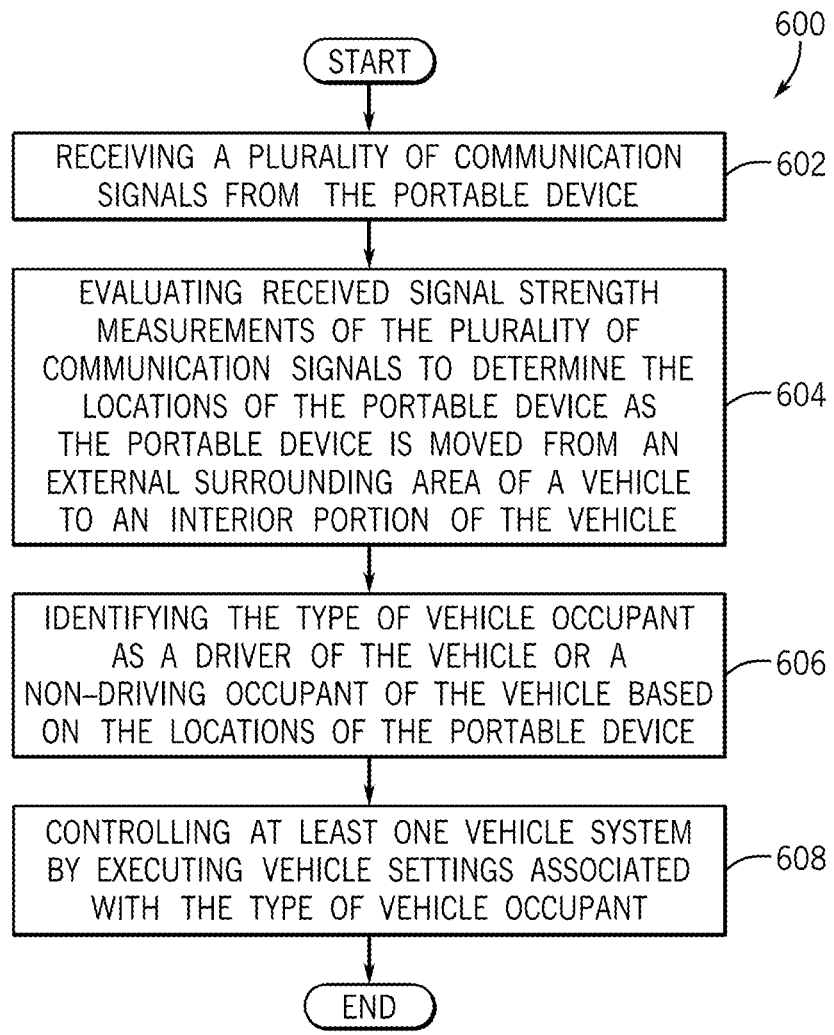
FIG. 6 is a process flow diagram of a method for identifying a type of vehicle occupant based on locations of a portable device according to an exemplary embodiment of the present disclosure.

FIG. 6 is a process flow diagram of a method 600 for identifying a type of vehicle occupant based on locations of a portable device 104 according to an exemplary embodiment of the present disclosure. FIG. 6 will be described with reference to the components of FIG. 1 and FIG. 2 though it is to be appreciated that the method of FIG. 6 may be used with other systems and/or components. The method 600 may begin at block 602, wherein the method 600 may include receiving a plurality of communication signals from the portable device 104.

The method 600 may proceed to block 604, wherein the method 600 may include evaluating received signal strength measurements of the plurality of communication signals to determine the locations of the portable device 104 as the portable device 104 is moved from an external surrounding area of a vehicle 102 to an interior portion of the vehicle 102. The method 600 may proceed to block 606, wherein the method 600 may include identifying the type of vehicle occupant as a driver of the vehicle 102 or a non-driving occupant of the vehicle 102 based on the locations of the portable device 104. The method 600 may proceed to block 608, wherein the method 600 may include controlling at least one vehicle system by executing vehicle settings associated with the type of vehicle occupant.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for identifying a type of vehicle occupant based on locations of a portable device comprising:
receiving a plurality of communication signals from the portable device;
evaluating received signal strength measurements of the plurality of communication signals and aggregating locational coordinates associated with locations of the portable device to determine a tracking pattern that includes a tracked path of the portable device as a user approaches a vehicle, enters the vehicle, and is seated within a particular seat of the vehicle;
identifying the user as a driver of the vehicle or a non-driving occupant of the vehicle based on the tracking pattern; and
controlling at least one vehicle system by executing vehicle settings associated with the driver of the vehicle and the non-driving occupant of the vehicle based on identifying the user as the driver of the vehicle or the non-driving occupant of the vehicle.

2. The computer-implemented method of claim 1, wherein receiving the plurality of communication signals includes receiving a plurality of polling response signals by at least one transceiver that is disposed near at least one external portion of the vehicle, by at least one transceiver that is disposed near at least one door of the vehicle, and by at least one transceiver that is disposed within an interior portion of the vehicle.

3. The computer-implemented method of claim 2, wherein evaluating the received signal strength measurements includes comparing received signal strength measurements of the received communication signals to at least one signal strength threshold value associated with the at least one transceiver disposed near the at least one external portion of the vehicle to determine a portion of the tracking pattern as the user is approaching the vehicle.

4. The computer-implemented method of claim 3, wherein the locational coordinates are associated with each location of the portable device as the user approaches the vehicle, wherein the locational coordinates are based on a grid model of a surrounding environment of the vehicle.

5. The computer-implemented method of claim 4, wherein evaluating the received signal strength measurements includes comparing received signal strength measurements of the communication signals to at least one signal strength threshold value associated with the at least one transceiver disposed within the interior portion of the vehicle to determine a portion of the tracking pattern as the user enters the vehicle, as the user is seated within the particular seat of the vehicle, and as the portable device is put within a stationary position within the vehicle.

6. The computer-implemented method of claim 5, wherein the stationary position includes at least one of: a location of the portable device associated with clothing of the user as the user is seated within the particular seat of the vehicle, a location of the portable device within a console of the vehicle, and a location of the portable device within a compartment of the vehicle.

7. The computer-implemented method of claim 6, wherein the locational coordinates are associated with each location of the portable device as the user enters the vehicle, as the user is seated within the particular seat of the vehicle, and as the portable device is put within the stationary position within the vehicle, wherein the locational coordinates are based on a grid model of the interior portion of the vehicle.

8. The computer-implemented method of claim 7, wherein identifying the user includes aggregating the locational coordinates of the portable device associated with the portion of the tracking pattern as the user is approaching the vehicle with the portion of the tracking pattern as the user enters the vehicle, as the user is seated within the particular seat of the vehicle, and as the portable device is put within a stationary position within the vehicle to determine the tracking pattern.

9. The computer-implemented method of claim 8, wherein the tracking pattern of the portable device is compared against at least one pre-stored driver device location pattern and at least one pre-stored non-driver device location pattern to identify the user as the driver or the non-driving occupant.

10. A system for identifying a type of vehicle occupant based on locations of a portable device comprising:
a memory storing instructions when executed by a processor cause the processor to:
receive a plurality of communication signals from the portable device;
evaluate received signal strength measurements of the plurality of communication signals and aggregate locational coordinates associated with locations of the portable device to determine a tracking pattern that includes a tracked path of the portable device as a user approaches a vehicle, enters the vehicle, and is seated within a particular seat of the vehicle;
identify the user as a driver of the vehicle or a non-driving occupant of the vehicle based on the tracking pattern; and
control at least one vehicle system by executing vehicle settings associated with the driver of the vehicle and the non-driving occupant of the vehicle based on identifying the user as the driver of the vehicle or the non-driving occupant of the vehicle.

11. The system of claim 10, wherein receiving the plurality of communication signals includes receiving a plurality of polling response signals by at least one transceiver that is disposed near at least one external portion of the vehicle, by at least one transceiver that is disposed near at least one door of the vehicle, and by at least one transceiver that is disposed within an interior portion of the vehicle.

12. The system of claim 11, wherein evaluating the received signal strength measurements includes comparing received signal strength measurements of the received communication signals to at least one signal strength threshold value associated with the at least one transceiver disposed near the at least one external portion of the vehicle to determine a portion of the tracking pattern as the user is approaching the vehicle.

13. The system of claim 12, wherein the locational coordinates are associated with each location of the portable device as the user approaches the vehicle, wherein the locational coordinates are based on a grid model of a surrounding environment of the vehicle.

14. The system of claim 13, wherein evaluating the received signal strength measurements includes comparing received signal strength measurements of the communication signals to at least one signal strength threshold value associated with the at least one transceiver disposed within the interior portion of the vehicle to determine a portion of the tracking pattern as the user enters the vehicle, as the user is seated within the particular seat of the vehicle, and as the portable device is put within a stationary position within the vehicle.

15. The system of claim 14, wherein the stationary position includes at least one of: a location of the portable device associated with clothing of the user as the user is seated within the particular seat of the vehicle, a location of the portable device within a console of the vehicle, and a location of the portable device within a compartment of the vehicle.

16. The system of claim 15, wherein the locational coordinates are associated with each location of the portable device as the user enters the vehicle, as the user is seated within the particular seat of the vehicle, and as the portable device is put within the stationary position within the vehicle, wherein the locational coordinates are based on a grid model of the interior portion of the vehicle.

17. The system of claim 16, wherein identifying the user includes aggregating the locational coordinates of the portable device associated with the portion of the tracking pattern as the user is approaching the vehicle with the portion of the tracking pattern as the user enters the vehicle, as the user is seated within the particular seat of the vehicle, and as the portable device is put within a stationary position within the vehicle to determine the tracking pattern.

18. The system of claim 17, wherein the tracking pattern of the portable device is compared against at least one pre-stored driver device location pattern and at least one pre-stored non-driver device location pattern to identify the user as the driver or the non-driving occupant.

19. A non-transitory computer readable storage medium storing instructions that when executed by a computer, which includes a processor perform a method, the method comprising:
receiving a plurality of communication signals from a portable device;
evaluating received signal strength measurements of the plurality of communication signals and aggregating locational coordinates associated with locations of the portable device to determine a tracking pattern that includes a tracked path of the portable device as a user approaches a vehicle, enters the vehicle, and is seated within a particular seat of the vehicle;
identifying the user as a driver of the vehicle or a non-driving occupant of the vehicle based on the tracking pattern; and
controlling at least one vehicle system by executing vehicle settings associated with the driver of the vehicle and the non-driving occupant of the vehicle based on identifying the user as the driver of the vehicle or the non-driving occupant of the vehicle.

20. The non-transitory computer readable storage medium of claim 19, wherein the tracking pattern of the portable device is compared against at least one pre-stored driver device location pattern and at least one pre-stored non-driver device location pattern to identify the user as the driver or the non-driving occupant.

* * * * *